Dec. 7, 1937.   H. NUTT ET AL   2,101,411
DRIVEN CLUTCH DISK
Filed Nov. 14, 1935   3 Sheets-Sheet 3
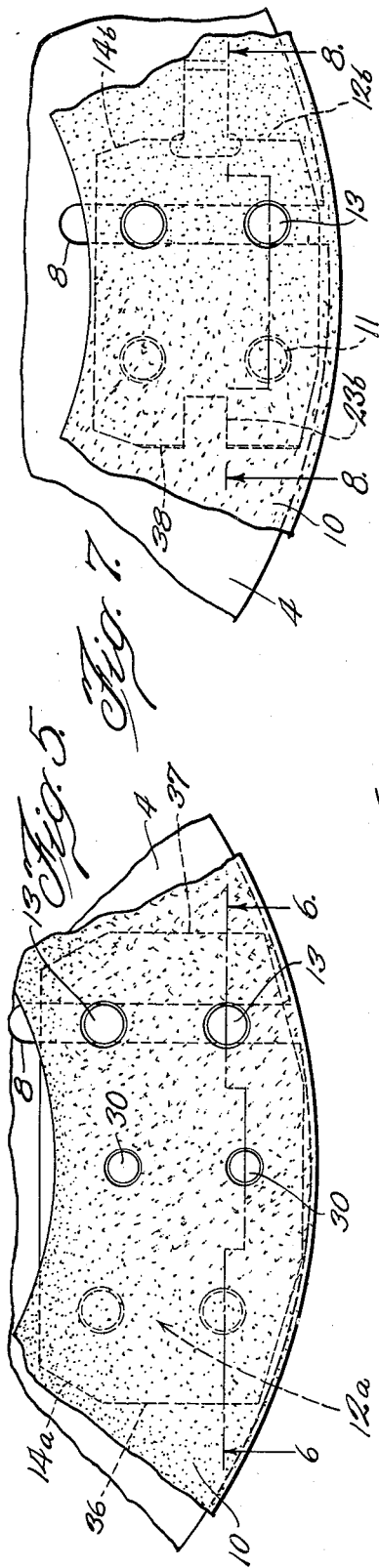
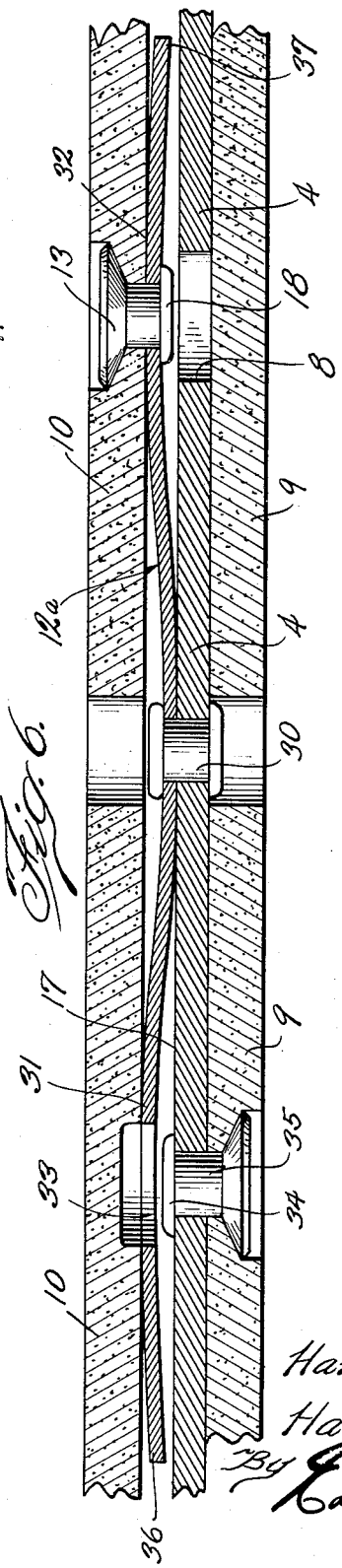
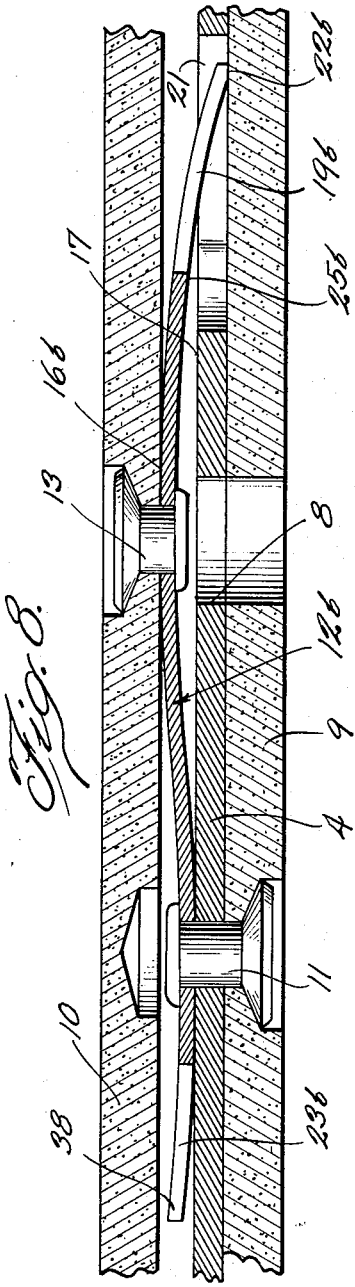
Inventors:
Harold Nutt &
Harold V. Reed
By Edward C. Fitzhugh
Atty.

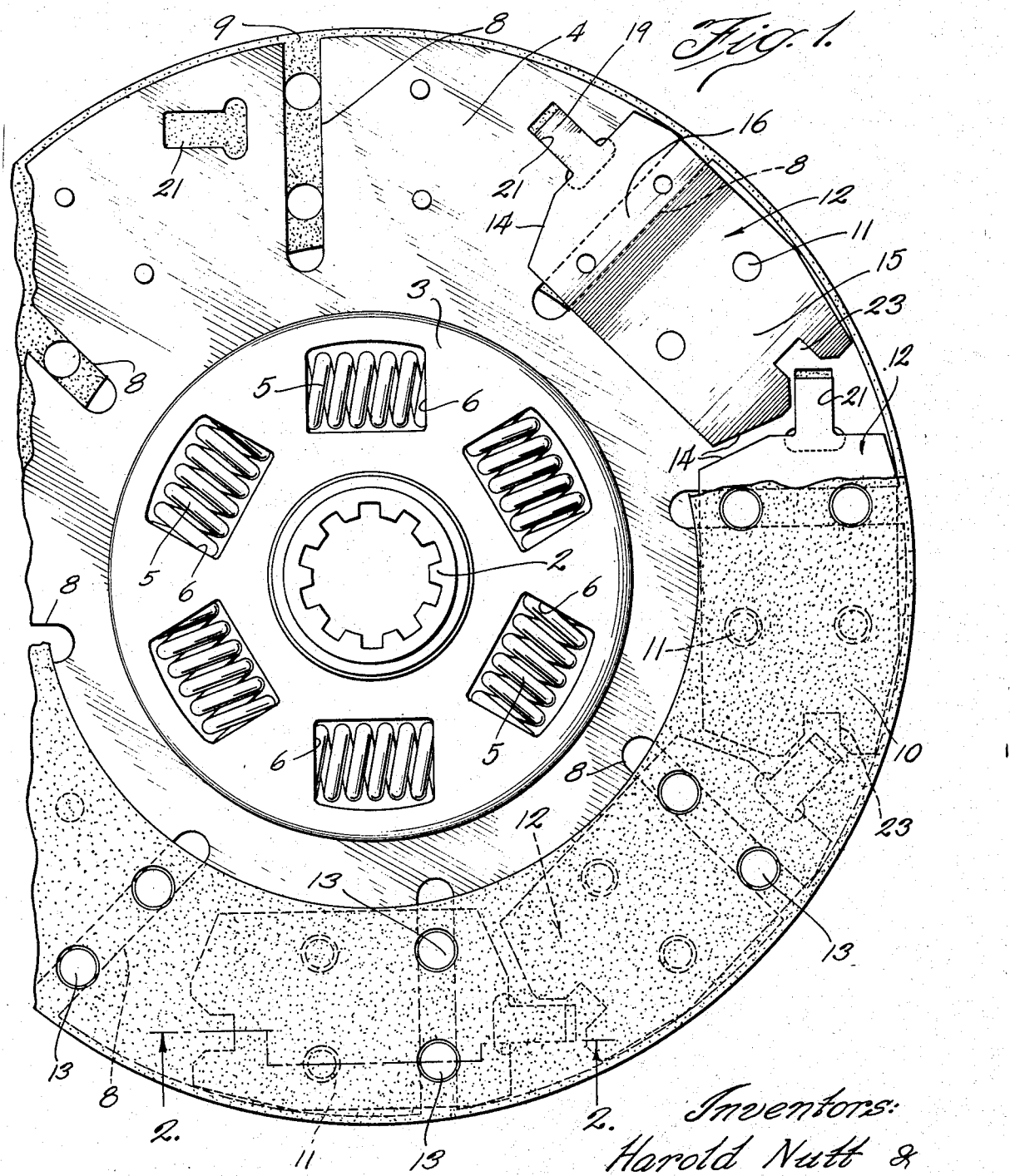

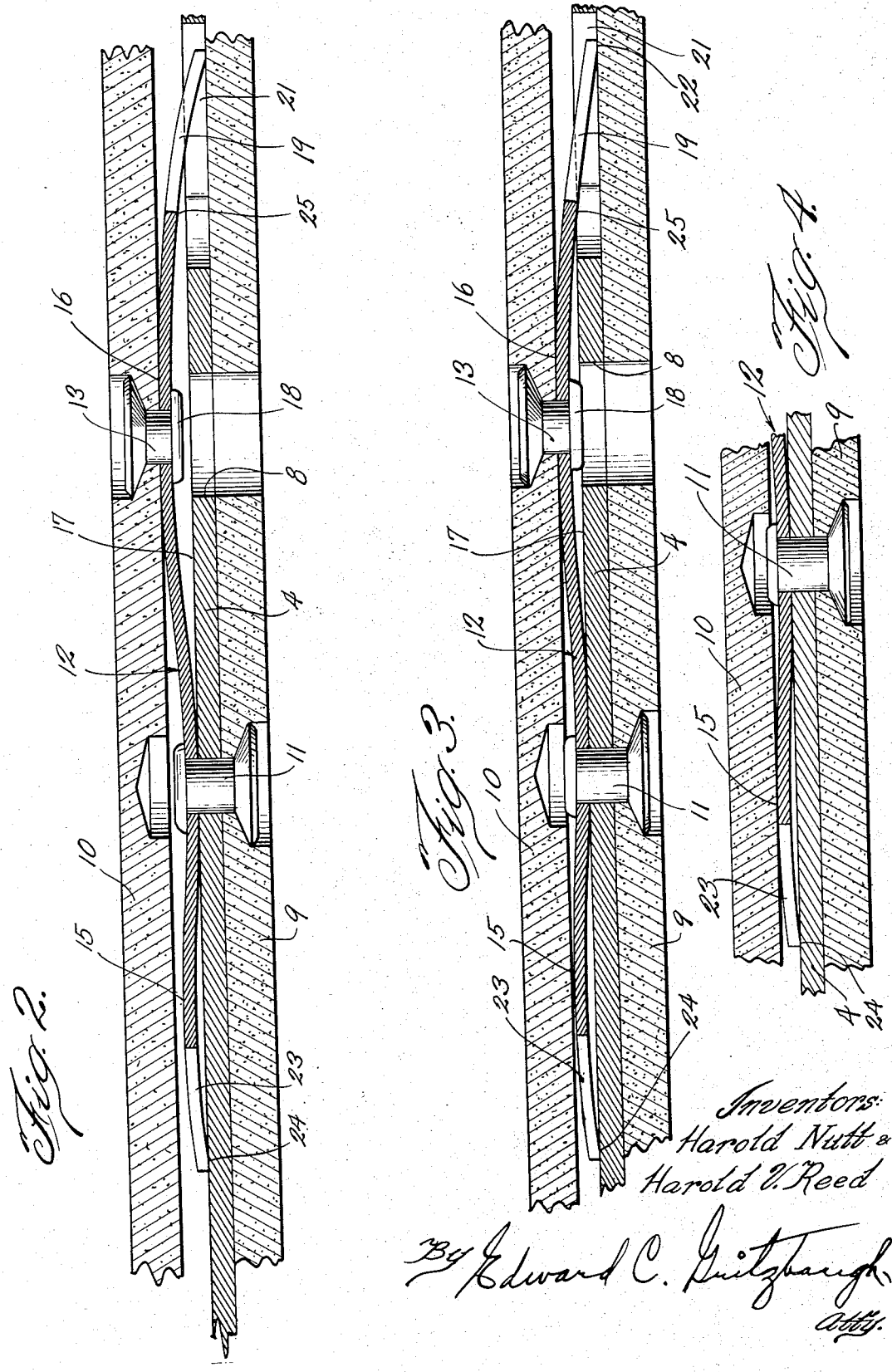

Patented Dec. 7, 1937

2,101,411

UNITED STATES PATENT OFFICE 2,101,411

DRIVEN CLUTCH DISK

Harold Nutt and Harold V. Reed, Chicago, Ill., assignors to Borg-Warner Corporation, Chicago, Ill., a corporation of Illinois Application November 14, 1935, Serial No. 49,653

7 Claims. (Cl. 192—107)

This invention relates to improvements in driven clutch disks and more particularly to driven clutch disks of the so-called "cushion" type adapted for use in establishing a running drive connection between the engine shaft and transmission shaft of a motor vehicle.

Our present invention comprises an improvement over the invention disclosed and claimed in our copending application Serial No. 701,888, filed December 11, 1933.

Clutch engagement action is generally smoother and less susceptible to chatter if the driven disk has a soft initial engagement. It is an object of our invention therefore, to provide an improved driven clutch disk having multiple stage cushions supporting at least one of the friction facings upon the driven plate which are so arranged as to provide a relatively soft cushion during the initial portion of the "slip" period and a cushion of greater resistance during the latter portion of the "slip" period. Stated in another manner our improved clutch disk is so constructed as to provide a relatively soft cushion during the light and moderate load "slip" periods and to maintain a condition approaching full compression during the full load "slip" period.

Another object is to provide cushion supports having contact with the friction member at closely spaced intervals, the contacting areas increasing as deflection takes place, until practically complete support of the facing over its entire area exists under full compression load. This condition insures uniform distribution of wear over the friction area.

Another object is to provide a construction in which the disposition of the rivets for attaching the facings is such that there is no relative motion between the facings and the rivets during compression of the cushion.

Another object is to provide an improved driven clutch disk in which single cushion members of simple form are employed which are so constructed and so arranged, relative to the parts of the disk assembly, that they possess multiple stage cushion characteristics.

A further object is to provide an improved driven clutch disk having cushion members which are structurally independent of the driven plate and which may therefore be formed of any desired thickness or outline at the time of manufacture, thus to facilitate predetermination of the cushion characteristics of the disk.

Other objects, the advantages and uses of the invention will become apparent after reading the following specification and claims, and after consideration of the accompanying drawings wherein:

Fig. 1 is an elevation, partially in section, illustrating a clutch disk constructed in accordance with our invention;

Fig. 2 is a sectional view along the line 2—2 of Fig. 1;

Fig. 3 is a view, similar to Fig. 2, illustrating the clutch disk as it appears during the second stage of compression;

Fig. 4 is a fragmentary view similar to Fig. 2, illustrating the clutch disk as it appears during the third stage of compression;

Fig. 5 is a fragmentary elevation of another form of the clutch disk;

Fig. 6 is a sectional view along the line 6—6 of Fig. 5;

Fig. 7 is a view, similar to Fig. 5, of another form of the clutch disk; and

Fig. 8 is a sectional view along the line 8—8 of Fig. 7.

With reference to Fig. 1 the clutch disk may include, as illustrated, a hub member 2, having a circumferential flange 3, and a driven plate 4. The plate 4 may be constructed of sheet steel and is mounted concentrically of the axis of the hub 2 and provided with a torque transmitting connection with the hub through the medium of a plurality of compression springs 5. The springs 5 may be located in aligned openings 6, formed in the plate 4 and the hub flange 3, as more fully illustrated and described in our co-pending application Serial No. 14,768, entitled "Clutch disks" filed Apr. 6, 1935. This construction represents a commercial type of clutch disk dampening mechanism and, though it smooths out the flow of power between the disk and the driven shaft upon which the hub 2 is adapted to be mounted, it does not form a part of our present improvement and therefore, may be replaced, if desired, with any conventional hub-plate assembly.

The outer portion of the plate 4 may be formed with a plurality of slots 8 therethrough, extending from the periphery of the plate toward the hub 2 along a line, parallel with a radial line drawn from the hub of the plate, but spaced to one side thereof as illustrated. The slots 8 possess the dual function of dividing the outer portion of the plate 4 into a plurality of relatively narrow separated sections to promote flexibility of the plate at its outer region and they also provide spaces within which the heads of certain of the friction facing rivets may enter during compression of the disk in a manner hereinafter explained.

Two annular friction facings 9 and 10, forming a part of the disk assembly, provide a means for frictional engagement between the clutch disk and the opposed facings of the conventional clutch driving assembly (not shown). The facing 9, which like the facing 10, may be constructed of any suitable friction material such as moulded composition with fibrous inclusions, may be secured directly to the plate 4 on one side thereof by a plurality of rivets 11. The facing 10 may be supported upon the other side of the plate 4 through the medium of a plurality of resilient cushion members 12 secured to the plate by the rivets 11 and to the facing 10 by rivets 13.

In the clutch disk of Fig. 1, we have provided for eight of the cushion members 12, one for each of the plate sections formed by the slots 8. The cushion members may be formed of relatively thin spring steel, substantially rectangular in shape, having portions of their side walls tapered as indicated at 14 to facilitate the placement of the cushion members in close end to end proximity with one another and in annular array about the outer region of the plate 4. With reference to Fig. 2, illustrating a longitudinal section of one of the cushion members 12, it will be noted that the cushion member is preformed to present two outwardly bowed portions 15 and 16, one on each side of the point of attachment of the cushion members to the plate 4 through the medium of the rivets 11. The cushion portion 16 is so formed as to extend farther away from the adjacent surface 17 of the plate 4 than the portion 15 and both of the bowed portions are substantially arcuate in form, being generated about lines that are parallel with the slot 8 and the aligned rivets 11 (see Fig. 1). The facing 10 may be secured directly to the bowed portions 16 of the cushion members by the rivets 13, two such rivets being used for each cushion member and so located that the heads 18 thereof may enter the adjacent slot 8 when the clutch disk is compressed.

Each of the cushion members 12 is further formed with an integral tongue 19 at the outer end of the bowed portions 16 which tongues are adapted to be received within the elongated portions of T-shaped slots 21 punched through the plate 4, one adjacent to each of the slots 8. The tongues 19 and the tongue receiving portions of the slots 21 preferably lie along axes that are parallel to the longitudinal axis of the cushion members so that compression of the cushion members, as the facings 9 and 10 are urged relatively toward one another will permit the outer ends of the tongues to slide along the adjacent and inner surface of the friction facing 9. In Fig. 3, we have shown an enlarged view of one of the tongues 19, illustrating the tapered portion 22 thereof, which facilitates the sliding movement of the tongues over the facing surface during disk compression. As the cushion members are compressed there is, of course, some elongation of the cushion members and hence relative rotary movement between the friction facing 10 and the plate 4. The opposite ends of the cushion members are provided with notches 23 adapted partially to receive the tongue 19 of the adjacent cushion member. These ends of the cushion members likewise extend toward the plate 4 and are adapted to bear thereupon, as indicated at 24 in Figs. 2 and 3.

In operation, our improved clutch disk provides, in its first stage of operation, a cushion characteristic between the opposed facings 9 and 10 that is relatively "soft". This is by virtue of the fact that movement of the facing 10 toward the plate 4 and hence the facing 9, is resisted only by the bowed portions 16 of the cushion members, the effective lengths of the bowed portions extending from the outermost end 22 of the tongue 19 to the rivets 11 (see Fig. 2). As the disk becomes further compressed it enters its second stage of operation by virtue of contact between the end portion 25 of the spring member and surface 17 of plate 4 as illustrated in Fig. 3, thus to shorten the effective length of the bowed portion 16. The third stage of cushion action takes place when the facing 10 contacts the bowed portion 15 of the spring members as illustrated in Fig. 4. During the third stage of operation, the clutch disk possesses relatively high resistance to compression and consequently maximum torque may be transmitted with "slip" before complete compression of the disk takes place.

It will be noted that the bowed portions 16 of the cushions, except for the relatively low resistance offered by the narrow tongues 19, operate during the first stage substantially as cantilever springs and during the second and third stages when the end portions 25 engage the surface 17 of the plate 4 as half elliptic springs. The tongues 19 cooperating with the slots 21 during both stages of cushion operation, function to preclude radial movement of the cushion members due to the action of centrifugal force.

Our improved clutch construction possesses the further and important advantage, in manufacture, of permitting readily of a pre-selection of the extent of cushion resistance for the several stages by mere choice of cushion members 12 of different thicknesses and of different relative curvature as to the bowed portions 15 and 16 thereof. This is an advantage which is not to be found in cushion clutch disks as employed heretofore in the art.

In Figs. 5 and 6, we have illustrated another form of our improved clutch disk which differs from that illustrated in Fig. 1, principally in the construction and mounting of the cushion members 12a. Parts heretofore identified by reference characters in Fig. 1, bear similar reference characters. In this form of the clutch disk the cushions 12a are fixed to the plate 4 by pairs of rivets 30, located at the center of the cushion members and disposed along a radial line drawn from the hub 2 parallel with the slot 8. The end portions of each of the cushion members 12a are formed with outwardly bowed portions 31 and 32 respectively, the outer ends of which curve toward, but normally do not touch the adjacent surface 17 of the plate 4. The facing 10 is secured to the portions 32 of the cushions by rivets 13, the heads 18 of which may enter, during disk compression, the adjacent slots 8. The curved portion 31 of the spring members contacts with but is not secured to the facing 10 and is formed with openings 33 therethrough for accommodating the head 34 of rivets 35, employed to secure the facing 9 to the plate 4.

In operation the clutch disk of Figs. 5 and 6 provides a relatively soft cushion characteristic during the first stage of its compression. As the facings 9 and 10 are moved relatively toward one another the outermost ends 36 and 37 of the cushion members 12a are caused to contact the surface 17 of the plate 4, thus to increase resistance to the compression of the cushion members by virtue of the fact that initially the portions 31 and 32 of the cushions operate as cantilever springs and in their second stage the cushions operate as half-elliptic springs by virtue of engagement between their outer ends and the plate 4.

In Figs. 7 and 8, we have illustrated another form of clutch disk which is identical with that form illustrated in Fig. 1 with the exception that the bowed portion 15 of the cushion member is not present. With reference to Fig. 8, each of the cushion members 12ᵇ is formed with an outwardly bowed portion 16ᵇ, having a tongue 19ᵇ, extending within a T-shaped slot 21 and adapted to slide upon the adjacent surface of the facing 9. Rivets 13 are employed to secure the facing 10 to the bowed portions 16ᵇ of the cushion. The opposite ends of the cushion members beyond the rivets 11 are curved upwardly away from the plate 4, as indicated at 38 and normally do not engage with the adjacent face of the facing 10.

During first stage operation of the clutch disk of Figs. 7 and 8, the effective length of the bowed portions 16ᵇ is from the tip of the tongues 19ᵇ to the rivets 11, thus providing by virtue of the narrow width of the tongues 19ᵇ relatively soft cushions acting substantially as cantilever springs. As the disk is further compressed, the facing 10 will contact with the portions 38 of the cushion members and the portions 25ᵇ will contact with the adjacent surface 17 of the plate 4, thus to shorten the effective length of the portion 16ᵇ and to increase the resistance by virtue of its action as a half-elliptic spring of the cushion which augmented by the engagement between the cushion portion 38 and the facing 10 provides a relatively high resistance to further compression of the disk representing the second stage operation of the cushion.

We claim:

1. In a friction clutch disk, a driven plate of relatively non-yielding material adapted to be mounted upon a shaft, an annular friction facing carried by said plate on one side thereof, a similar friction facing disposed upon the opposite side of the plate in normally spaced apart relationship relative thereto, and multi-stage cushion means carried by said plate yieldingly to support said last named facing thereupon, said means comprising a plurality of structurally independent relatively light spring steel members each fixed adjacent one end to the plate and each free at its outer end and having an intermediate bowed portion contacting with and secured to said last named facing, said free ends of said cushion members being adapted, during compression of the disk, to engage with and abut a portion of said plate and first named facing assembly.

2. A friction clutch disk, as defined in claim 1, wherein the resilient members are arranged with their longitudinal axes extending circumferentially of the plate and wherein the bowed portion of each resilient member is bowed in a substantially arcuate curve.

3. A friction clutch disk, as defined in claim 1, wherein the cushion members extend in annular array about the outer region of the plate.

4. A friction clutch disk as defined in claim 1, wherein the said free ends of the cushion members are more yielding than the said intermediate portions thereof.

5. A clutch plate having a friction facing located on one side thereof adjacent to its periphery, resilient cushions extending away from the body of said plate and secured to said facing whereby yieldingly to support the facing in parallel relationship relative to the body of the plate, said resilient cushions being bent in the direction of the plate at the outer end portions but normally free of contact with the plate, whereby resistance to movement of the facing toward the body of the plate may take place in two successive stages, firstly, by cushion resistance prior to contact between the said outer end portions and the plate, and secondly, by cushion resistance after contact between said outer end portions and the plate.

6. A friction clutch disk comprising, a driven plate adapted to be mounted on a shaft, a pair of annular friction facings, one for each side of said plate, and means carried by said plate providing resilient cushion members extending generally in a circumferential direction relative to said plate and having intermediate portions normally spaced away from said plate, one of said facings being secured to said intermediate cushion portions, thereby to provide a resilient support for the facing relative to said plate, said plate having openings therethrough, said cushions having other portions at the outer ends thereof beyond said intermediate portions extending through the openings in said plate and adapted to engage the other facing, said resilient cushion members being formed of relatively thin spring steel and secured to the driven plate and to the annular friction facing by rivets.

7. A friction clutch disk comprising, a driven plate adapted to be mounted upon a shaft, a pair of annular friction facings, one for each side of said plate, means securing one of said facings to said plate, and means carried by said plate providing a plurality of resilient cushion members yieldingly to support the other facing upon said plate in spaced apart and substantially parallel relationship thereto, said cushions extending in a circumferential direction relative to said plate and having portions bowed away from said plate and other portions at the free ends thereof extending in the direction of the plate, said plate having openings therethrough whereby the said end portions of said cushions may contract with said first named facing and may slide thereupon during compression of the cushion, the free ends of said cushion members being in the form of tongues having a width less than the normal width of the cushion members.

HAROLD NUTT.
HAROLD V. REED.